April 14, 1925. 1,533,905
H. M. STAUFFER ET AL
BROODER HOUSE
Filed Dec. 18, 1923 6 Sheets-Sheet 1
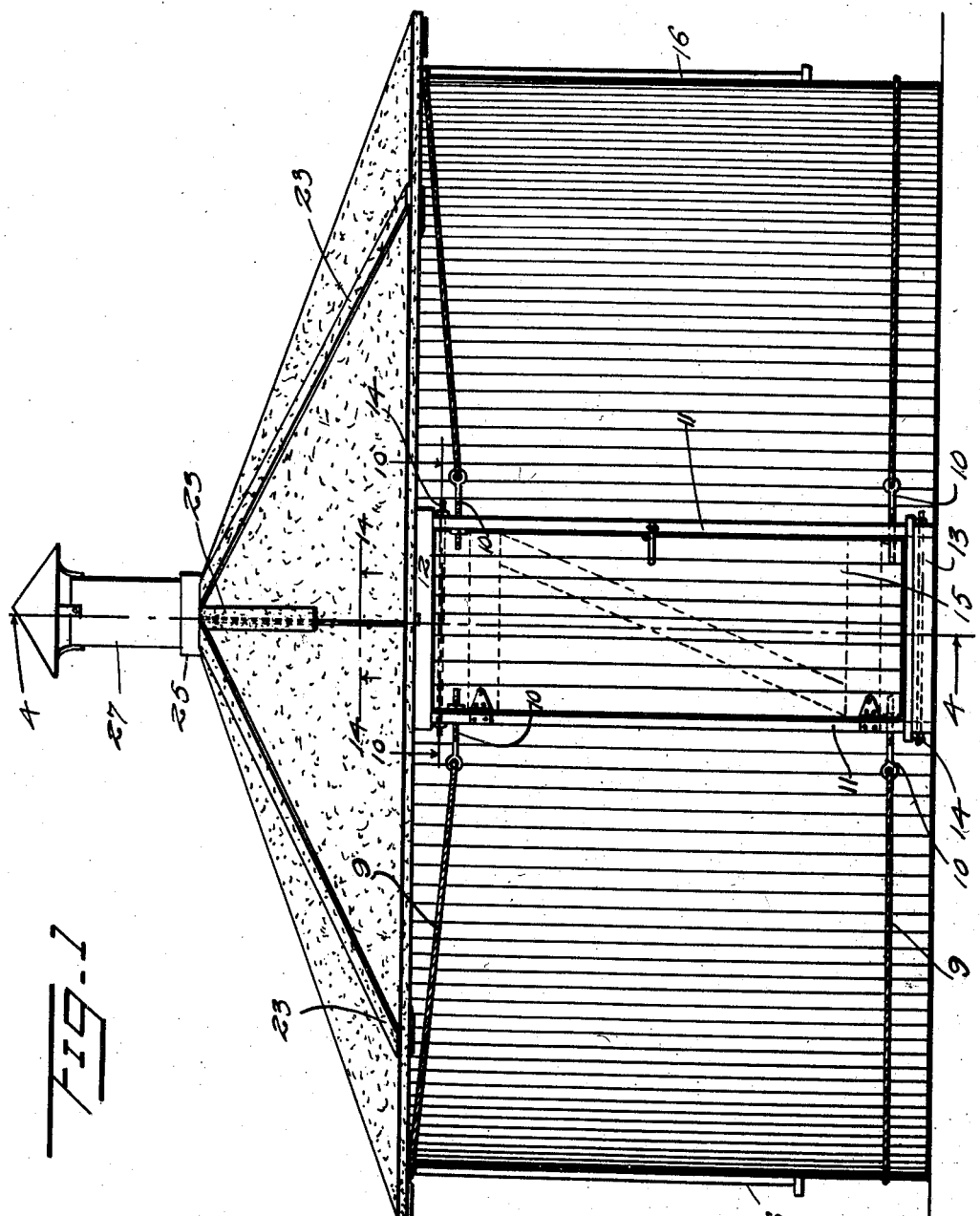

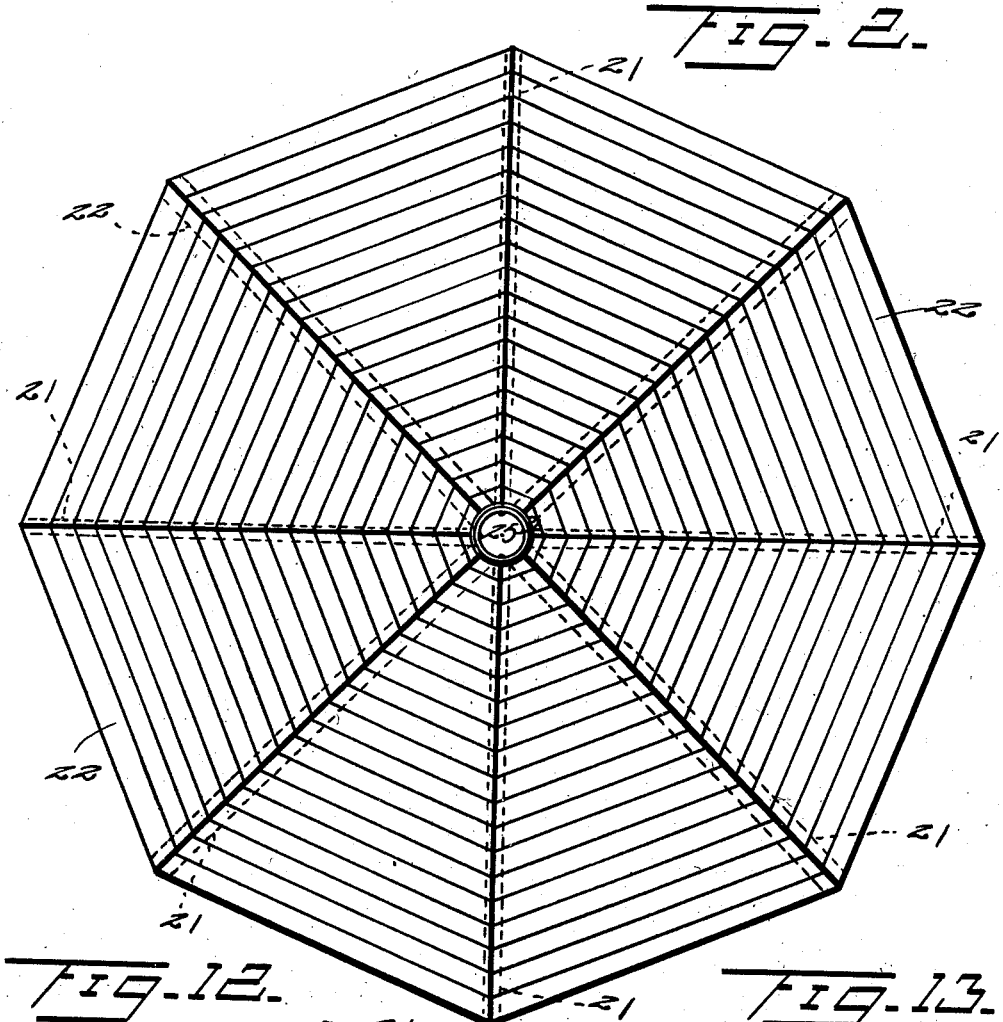
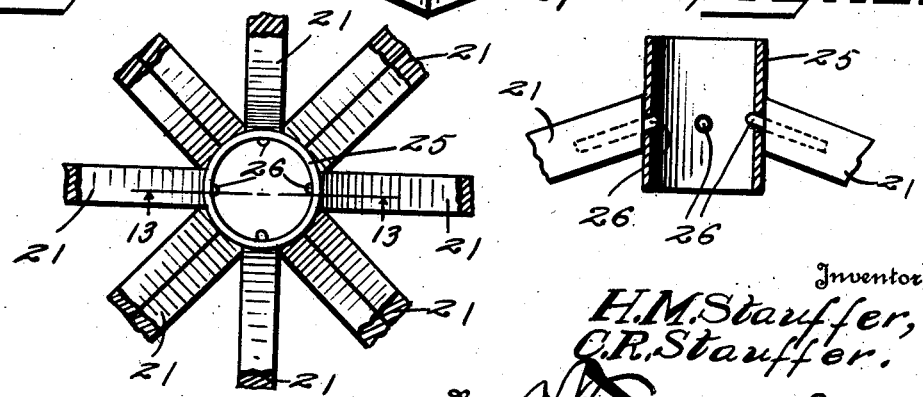

April 14, 1925.
H. M. STAUFFER ET AL
BROODER HOUSE
Filed Dec. 18, 1923
1,533,905
6 Sheets-Sheet 3
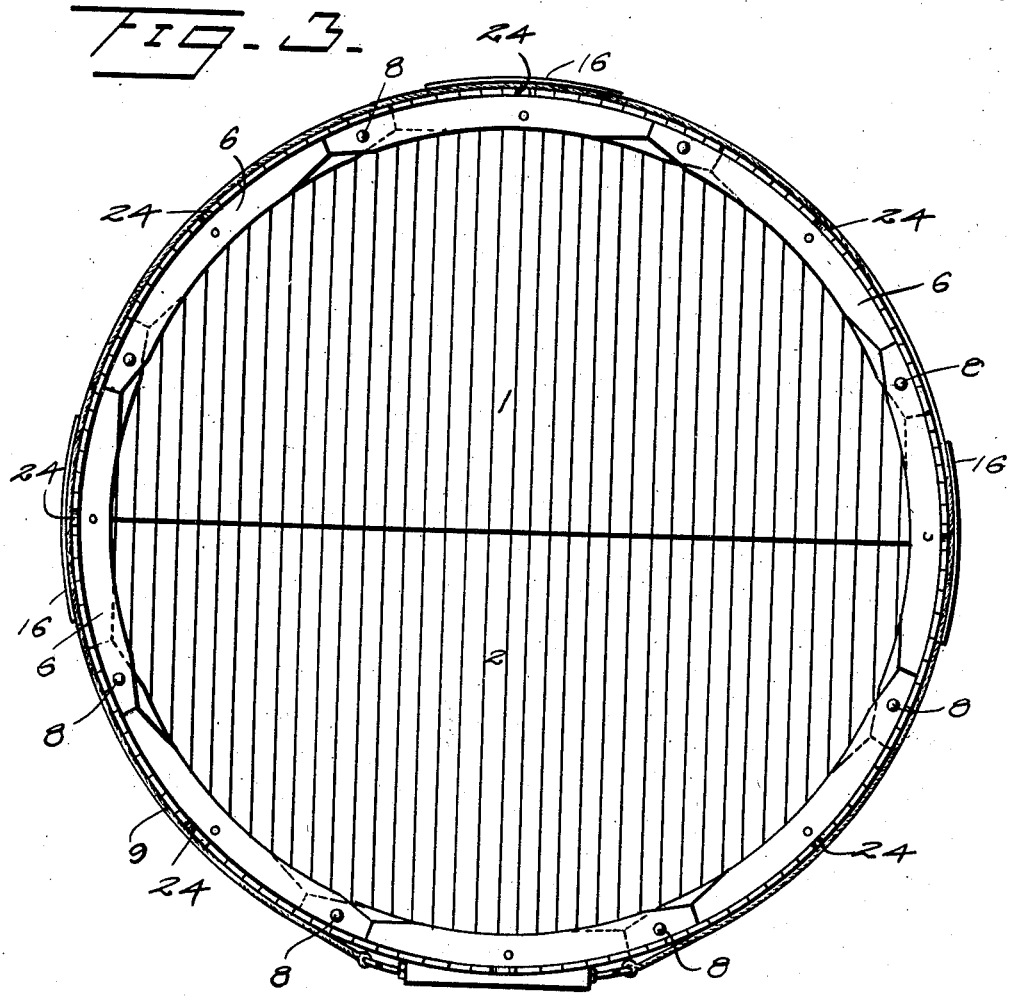
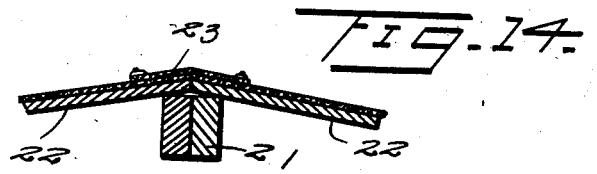
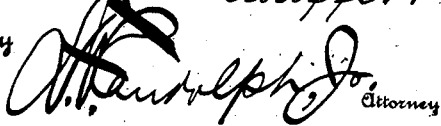

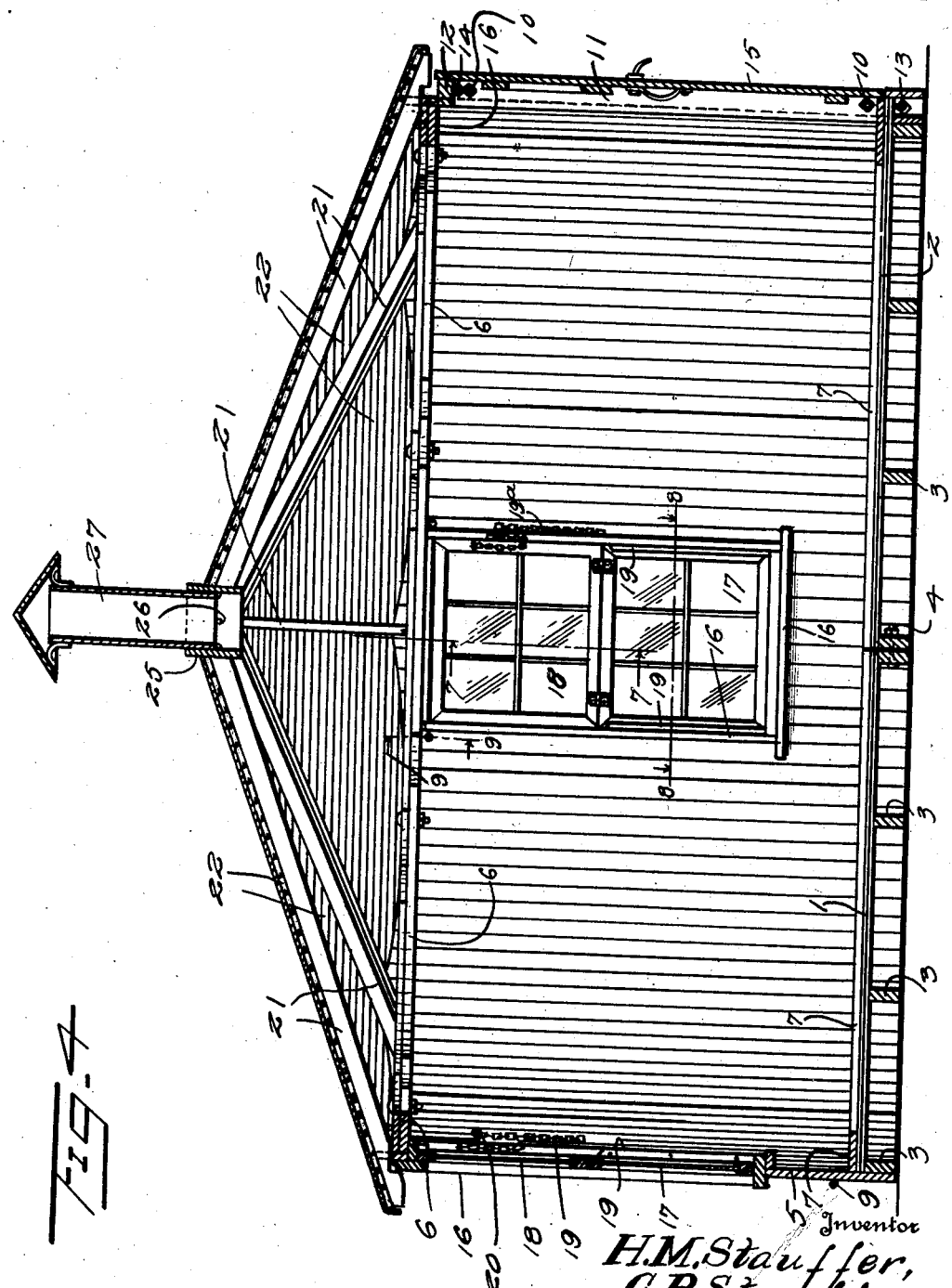

April 14, 1925.
H. M. STAUFFER ET AL
1,533,905
BROODER HOUSE
Filed Dec. 18, 1923
6 Sheets-Sheet 5
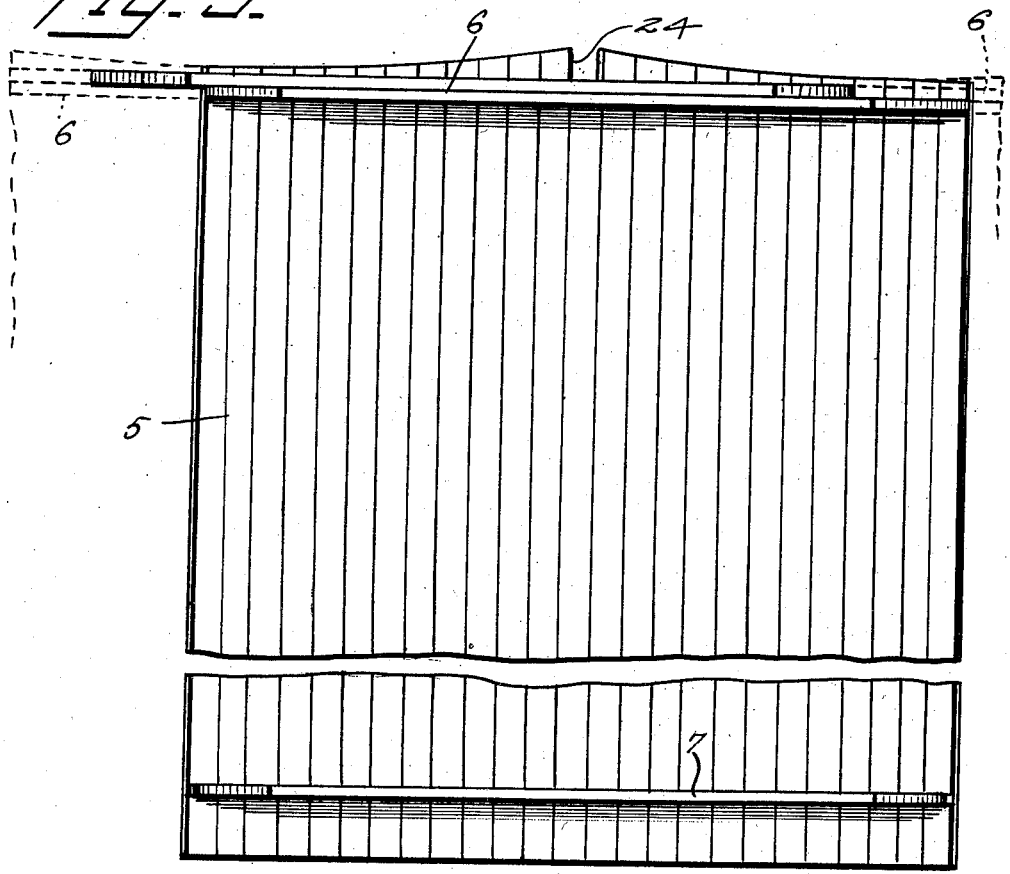
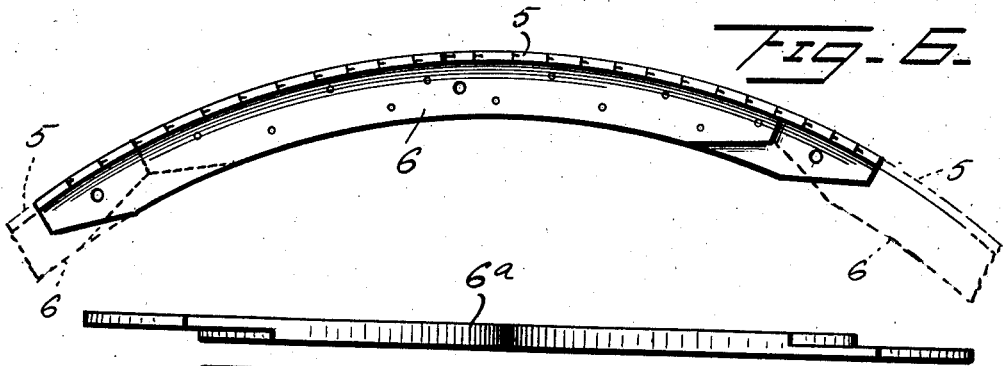

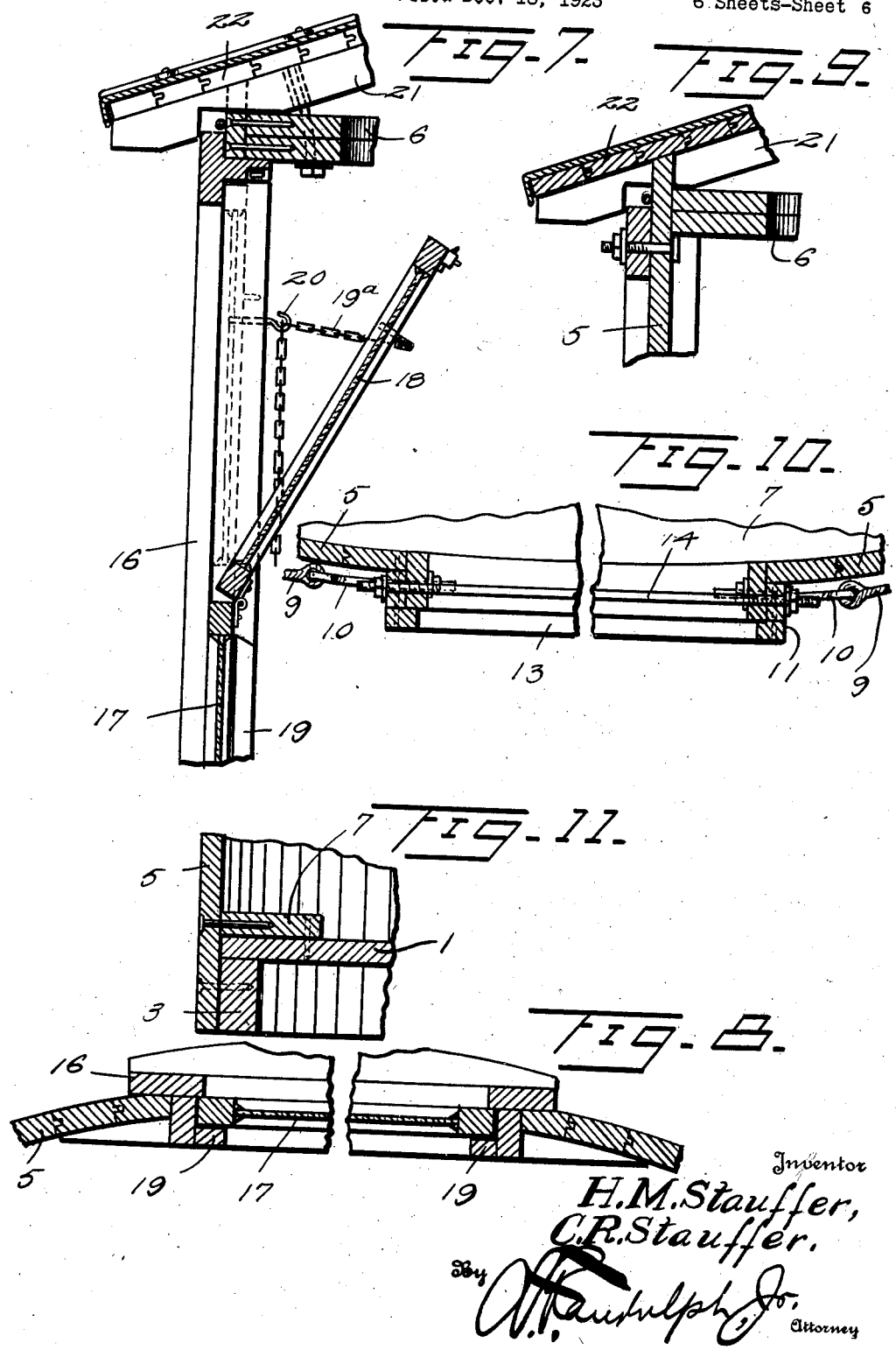

Patented Apr. 14, 1925.

1,533,905

UNITED STATES PATENT OFFICE.

HENRY M. STAUFFER AND CLAUDE R. STAUFFER, OF LEOLA, PENNSYLVANIA.

BROODER HOUSE.

Application filed December 18, 1923. Serial No. 681,389.

*To all whom it may concern:*

Be it known that we, HENRY M. STAUFFER and CLAUDE R. STAUFFER, citizens of the United States, residing at Leola, in the county of Lancaster and State of Pennsylvania, have invented certain new and useful Improvements in Brooder Houses; and we do hereby declare the following to be a full, clear, and exact description of the invention, such as will enable others skilled in the art to which it appertains to make and use the same.

The present invention has relation to a brooder for the care of chicks when hatched and aims to provide a structure which prevents the crowding and the injurious results incident thereto, the structure being constructed with a view to be shipped in a knock-down condition and readily assembled and made secure and adapted to be easily dismembered, whereby it is rendered portable and adapted to be moved from one place to another as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is an elevational view of a brooder house embodying the invention,

Figure 2 is a top plan view thereof,

Figure 3 is a top plan view of the brooder house with the roof removed,

Figure 4 is a vertical transverse sectional view on the line 4—4 of Figure 1,

Figure 5 is an enlarged elevational view of an enclosing wall section as seen from the inner side, Figure 6 is a top plan view of the wall section shown in Figure 5, Figure 7 is an enlarged sectional view on the line 7—7 of Figure 4, Figure 8 is an enlarged sectional view on the line 8—8 of Figure 4, parts being broken away.

Figure 9 is an enlarged sectional view on the line 9—9 of Figure 4,

Figure 10 is an enlarged sectional view on the line 10—10 of Figure 1, parts being broken away, Figure 11 is an enlarged sectional view illustrating the manner in which the wall sections and floor sections are assembled and connected, Figure 12 is an enlarged detail view illustrating the manner in which the rafter and collar are connected, Figure 13 is a detail section on the line 13—13 of Figure 12, Figure 14 is a sectional detail on the line 14—14 of Figure 1, and Figure 15 is an edge view of a modified form of cleat or tie for the elements or boards comprising a wall section.

Corresponding and like parts are referred to in the following description and designated in the several views of the drawings by like reference characters.

The brooder is in the form of a house and comprises a floor, enclosing walls and roof, said parts being of sectional formation to admit of the structure being shipped in knock-down form and easily and readily assembled and capable of being readily dismembered, whereby it is rendered portable and adapted to be shifted from one place to another. The enclosing wall is of circular outline, as shown most clearly in Figure 3, thereby preventing the formation of angles in which the chicks would tend to collect, and which is productive of injurious effects. The floor is of circular outline and comprises two similar semicircular sections 1 and 2 which meet on a diametrical line, the boards comprising the floor being attached to sills 3, the diametrical sills being disposed to abut, as shown most clearly in Figure 4, and receiving bolts 4, whereby the sections 1 and 2 are connected when disposed in operative position.

The enclosing wall comprises a plurality of sections 5, each of the sections comprising an upper cleat or tie 6 and a lower cleat or tie 7 to which the vertically disposed boards are attached. The lower cleat or tie 7 is positioned to overlap and rest upon the floor when the structure is erected, as shown most clearly in Figures 4 and 11. The upper cleat or tie 6 has its opposite end portions halved, whereby lapped joints are formed between the cleats or ties of adjacent wall sections, the overlapping ends receiving bolts 8 or analogous fastenings. The wall sections when assembled are further held together by means of flexible ties 9 which may consist of cables or chains, the chains encompassing the sections near the top and near the bottom thereof. The flexible ties 9 are attached at their ends by means of bolts 10 to the uprights 11 of a door frame set into the enclosing wall and extending the full height thereof and having the lintel 12 and sill 13 secured between the uprights 11 by means of tie rods 14. The door 15 is hinged to one of the uprights 11 and provides for ingress and egress.

Windows are set in the enclosing wall, one diametrically opposite the door and the other two at points intermediate the door and the window opposite thereto. Each of the windows comprises a frame 16, a lower sash 17 and an upper sash 18, the latter being hinged at its bottom to the top of the sash 17, as indicated most clearly in Figure 7. The inner stop 19 terminates a short distance below the top of the sash 17, thereby admitting of the sash being removed from the frame when required. A chain 19ª attached to the hinged sash 18 is adapted to cooperate with a hook 20 whereby the sash 18 may be held at the required adjusted position, when swung inward for ventilation.

The roof comprises similar or like sections which, when placed in position, slope outwardly and downwardly. In the present instance, the roof is shown as comprising four sections, the latter comprising rafters 21 to which the boards 22 are attached, and said roof may be covered by any preferred protecting material. When the sections are assembled, the joints are closed by means of strips 23 which shed water and prevent the same from leaking through the roof. The rafters 21 are notched at their outer or lower ends to receive the wall, the latter being notched in its upper edge, as indicated at 24, to receive the notched end of the rafter, whereby the parts when assembled are held in place. A collar 25 is disposed centrally of the roof and is provided in its sides with openings to receive dowels 26 at the upper inner ends of the rafters 21. A smoke pipe 27 may be fitted to the collar 25 and the smoke pipe from a stove (not shown) may connect therewith to carry off the smoke and products of combustion when the stove is lighted in cold weather.

The upper cleats 7 preferably consist of two strips placed one upon the other and bolted or otherwise secured, but as shown in Figure 15, the cleat or tie 6ª may consist of a single piece, opposite end portions of which are cut away or halved to provide for the lock joint formed between the upper cleats or ties when the wall sections are assembled.

It is observed that the enclosing wall of the structure is without angles, hence obviates the crowding or grouping of chicks occurring in brooders having angularly disposed walls. Moreover, the structure may be transported, knocked down and may be readily set up, and subsequently taken apart if desired to be moved from place to place, as occasion may require, and when set up the structure is roomy and affords a maximum amount of light and ventilation and may be easily cleaned and maintained in a sanitary condition.

What is claimed is:

1. A brooder house comprising a sectional floor, a sectional enclosing wall embodying upper and lower cleats on the inner surface thereof, the lower cleats being disposed to overlap and rest upon the floor, and the upper cleats having their ends halved to provide lap joints, a flexible tie exteriorly encircling the enclosing wall and assisting materially in retaining the sections in place, a sectional roof including rafters which are let into notches in the top of the outer wall and which are notched in turn to receive said wall, said tie being disposed in the notches of the rafter and a collar having the roof sections grouped therearound and receiving dowels projecting from the rafters, the enclosing wall being provided with a door and windows.

2. A brooder house having an upstanding sectional side wall, means on the interior of the wall to secure the sections together, a door having a frame extending outwardly beyond said wall, flexible securing means anchored to the door outwardly of said wall and encircling said wall, a top on said wall and notched to engage the same, and said flexible elements being disposed in the notches of the top.

In testimony whereof we affix our signatures in presence of two witnesses.

HENRY M. STAUFFER.
CLAUDE R. STAUFFER.

Witnesses:
R. K. COOPER.
GRACE COOPER.